3,847,982
OXYGENATED N-BENZOYL-N,2,3,3-TETRA-
METHYL-EXO-2-NORBORNANAMINES

Milton E. Herr, Kalamazoo, Herbert C. Murphy, Hickory Corners, and Gunther S. Fonken, Charleston Township, Kalamazoo County, Mich., assignors to The Upjohn Company, Kalamazoo, Mich.

No Drawing. Original application July 15, 1970, Ser. No. 55,272, now Patent No. 3,717,650. Divided and this application Nov. 24, 1972, Ser. No. 309,413

Int. Cl. C07c 103/22

U.S. Cl. 260—558 R                           12 Claims

ABSTRACT OF THE DISCLOSURE

This invention relates to a novel microbiological process for the oxygenation of N-benzoyl-N,2,3,3-tetramethyl-exo-2-norbornanamine to obtain N-benzoyl-exo-6-hydroxy-N,2,3,3-tetramethyl-exo-2-norbornanamine and N-benzoyl-trans - 7 - hydroxy-N,2,3,3-tetramethyl-exo-2-norbornanamine, each of which are chemically converted to novel derivatives. These novel bioconversion products and their derivatives are active hypotensive agents and central nervous system stimulants.

This is a division of application Ser. No. 55,272, filed July 15, 1970, now U.S. Pat. 3,717,650.

SUMMARY OF THE INVENTION

The novel compounds of this invention are illustratively represented by the following structural formulae:

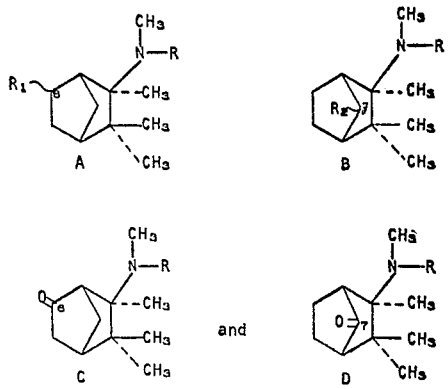

wherein R is hydrogen, benzyl or benzoyl and $R_1$ and $R_2$ are each hydroxy, methoxy or acyloxy; and the pharmacologically acceptable acid addition salts of the basic compounds of formulae A, B, C and D above, wherein R is hydrogen or benzyl.

In this application the wavy lines ($\wr$) appearing at the 6-position in the structural formula is indicative of compounds having the 6-exo configuration, the 6-endo configuration and mixtures thereof and the wavy line appearing at the 7-position of the structural formula is indicative of compounds having the 7-cis configuration, the 7-trans configuration and mixtures thereof. The 7-cis and 7-trans configurations are relative to the 2-methylamino group.

The novel compounds of this invention represented by formulae A, B, C and D, above, and the pharmacologically acceptable acid addition salts of the basic compounds of formulae A, B, C and D, wherein R is hydrogen or benzyl, have ganglionic blocking activity and are useful hypotensive agents; they are also central nervous system stimulants. As hypotensive agents they are useful for lowering blood pressure, and as central nervous system stimulants they are mood elevators and psychic energizers which are useful in the treatment of mental health conditions.

The novel compounds of this invention and the pharmacologically acceptable acid addition salts thereof are useful in the treatment of animals and birds, and are particularly useful in the treatment of humans and valuable domestic animals. They can be administered as active ingredients in conventional pharmaceutical forms such as tablets, capsules, elixirs, injectable solution and suspensions.

The novel compounds of this invention, represented by formulae A, B, C and D, above, are prepared by subjecting N-benzoyl-N,2,3,3-tetramethyl-exo-2-norbornanamine to the oxygenating activity of the microorganism *Sporotrichum sulfurescens* to obtain N-benzoyl-exo-6-hydroxy-N,2,3,3-tetramethyl-exo-2-norbornanamine and N-benzoyl-trans - 7 - hydroxy - N,2,3,3-tetramethyl-exo-2-norbornanamine, each of which are converted to the other novel compounds of this invention in accordance with methods known in the art.

DETAILED DESCRIPTION OF THE INVENTION

The microbiological process of this invention is represented by the following reaction scheme:

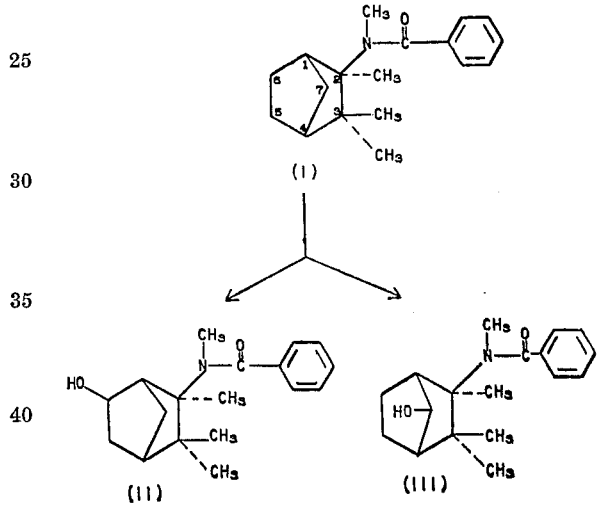

The microbiological process of this invention comprises subjecting N - benzoyl-N-2,3,3-tetramethyl-exo-2-norbornanamine (I) to the oxygenating activity of the microorganism *Sporotrichum sulfurescens*, to obtain N-benzoyl-exo - 6 - hydroxy - N,2,3,3 - tetramethyl-exo-2-norbornanamine (II) and N-benzoyl-trans-7-hydroxy-N,2,3,3-tetramethyl-exo-2-norbornanamine (III).

The genus Sporotrichum belongs to the family Moniliaceae of the order Moniliales of the class Deuteromycetes. The typical strain preferred for the practice of this invention is *Sporotrichum sulfurescens*, Collection No. ATCC 7159; available from the American Type Culture Collection (ATCC), Washington, D.C. It is to be understood that other strains of these microorganisms are suitable for the practice of this invention.

The starting material (I) for the microbiological process of this invention is prepared by treating N,2,3,3-tetramethyl-exo-2-norbornanamine, hydrochloride (mecamylamine, hydrochloride) with dilute sodium hydroxide followed by treatment with benzoyl chloride in accordance with Preparation 1, herein, to obtain N-benzoyl-N,2,3,3-tetramethyl-exo-2-norbornanamine (I).

The operational conditions and reaction procedures for bioconversion process of this invention are advantageously those known in the art of bioconversion as illustrated in Murray et al., U.S. Pats. 2,602,769 and 2,735,-800, utilizing the oxygenating activity of the microorganism.

Sporotrichum sulfurescens

In the practice of this invention, the bioconversion can be effected by a growing or resting culture of the microorganism or by spores, washed cells or enzymes of the microorganism.

Culture of the microorganism for the purpose and practice of this invention is in or on a medium favorable to its development. Sources of nitrogen and carbon should be present in the culture medium and an adequate sterile air supply should be maintained during the conversion, for example, by the conventional techniques of exposing a large surface of the medium or by passing air through a submerged culture.

Nitrogen in assimilable form can be provided by sources normally employed in such processes, such as corn steep liquor, soybean meal, yeast extracts, peptone, soluble or insoluble vegetable or animal protein, lactalbumin, casein, whey, distillers solubles, amino acids, nitrates and ammonium compounds, such as ammonium tartrate, nitrate, sulfate and the like.

Available carbon can also be provided by sources normally used in bioconversions such as carbohydrates, e.g., glucose, fructose, sucrose, lactose, maltose, dextrines, starches: meat extracts, peptones, amino acids, proteins, fatty acids, glycerol, whey and the like. These materials may be used either in a purified state or as concentrates such as whey concentrate, corn steep liquor, grain mashes, and the like, or as mixtures of the above. Many of the above sources of carbon can also serve as a source of nitrogen.

The medium can desirably have a pH before inoculation of between about 4 to about 7 though a higher or lower pH can be used. A temperature between about 25 to 32° C. is preferred for growth of the microorganism but higher or lower temperatures within a relatively wide range are suitable.

The substrate (I) can be added to the culture during the growth period of the microorganism as a single feed or by gradual addition during the conversion period, or it can be added to the medium before or after sterilization or inoculation making appropriate adjustments for effects of pH and/or temperature upon the stability of the substrate. The preferred, but not limiting, range of concentration of the substrate in the culture medium is about 0.1 to 10 grams per liter. The substrate is added to the medium in any suitable manner, especially one which promotes a large surface contact of the substrate to the oxidizing activity of the microorganism, for example by dissolving the substrate in an organic solvent and mixing the solution thoroughly with the medium or by adding to the medium finely comminuted particles of the substrate, e.g., micronized particles, preferably 90% by weight smaller than 20 microns, either as a dry powder or, preferably for mechanical reasons, as an aqueous suspension. In preparing the aqueous suspension, the use of dispersing or suspending agents is advantageous. Dispersing agents can also be added to the medium.

The temperature during the fermentation can be the same as that found suitable for growth of the microorganism. It need be maintained only within such range as supports life, active growth or the enzyme activity of the microorganism, the range of 20 to 30° C. is preferred. A pH of about 4 to 8 is generally preferred for growth of the microorganism during the bioconversion. Aeration can be effected by surface culture or preferably under submerged fermentation conditions, in accordance with methods well known in the art. The time required for oxygenation by the enzymatic system of the microorganism employed can vary considerably. The range of about 2 to 120 hours is practical but not limiting; 72 hours is generally satisfactory. The progress of the bioconversion and its completion are conveniently determined by paper-strip chromatography, vapor-phase chromatography, or thin-film chromatography [Haftman, Chromatography (1961) Reinhold Publishing Co., New York, N.Y.].

Alternatively, the oxygenation of the selected substrate can be effected under aerobic conditions by subjecting it to the oxygenating action of oxygenating enzymes isolated from the microorganism, to the action of spores of the microorganism, and to the action of isolated cells of the microorganism. Isolated enzyme preparations can be prepared in accordance with the general procedure disclosed by Zuidweg et al., Biochim. Biophy. Acts, 58, 131–133 (1962). Oxygenation can be effected with spores in accordance with the general process disclosed in U.S. Pats. 3,031,379 and 3,031,382. The separation of washed cells from the fermentation medium is well known in the art, see for example, U.S. Pat. 2,831,789.

The term "oxygenating activity" as used throughout this specification means the enzymatic action of a growing or resting culture of the microorganism or of spores, washed cells or isolated enzymes of the microorganism, which effects introduction of oxygen in the molecule of the substrate under aerobic fermentation conditions.

After completion of the fermentation, the resulting oxygenated products (II) and (III) are recovered from the fermentation beer by conventional methods. For example, the whole beer can be extracted with a water-immiscible organic solvent such as methylene chloride, chloroform, carbon tetrachloride, ethylene chloride, trichloroethylene, ether, amyl acetate, benzene, and the like or the beer and mycelia can be separated by conventional methods such as centrifugation or filtration, and then separately extracted with suitable solvents. The mycelia can be extracted with either water-miscible or water-immiscible solvents or in cases where little or no product is contained in the mycelium, it can be merely washed with water and the wash water added to the beer filtrate. The beer, free of mycelia, can then be extracted with water-immiscible solvents such as those listed above. The extracts are combined, dried over a drying agent such as anhydrous sodium sulfate, and the solvent removed by conventional methods such as evaporation or distillation at atmospheric or reduced pressure.

Alternatively, the products can be adsorbed from the beer on granular charcoal and the products eluted with a polar organic solvent such as methanol, ethanol, acetone, ethyl acetate, and the like.

The oxygenated products (II) and (III) obtained by either the extraction or elution procedures can be isolated and further purified by conventional methods, e.g., chromatography and/or crystallization, and the like.

The compounds of formulae (II) and (III) are converted to the other compounds of this invention in accordance with the following reaction schemes:

SCHEME 1

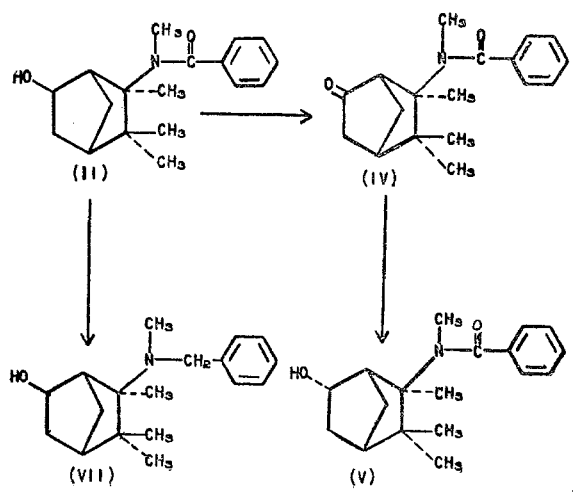

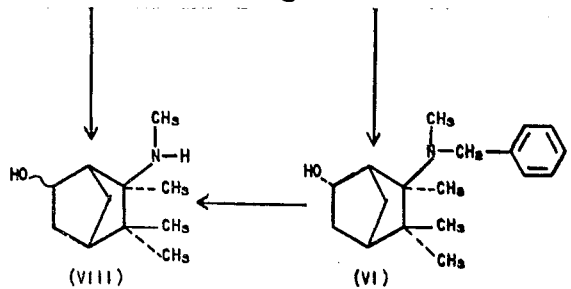

SCHEME 2

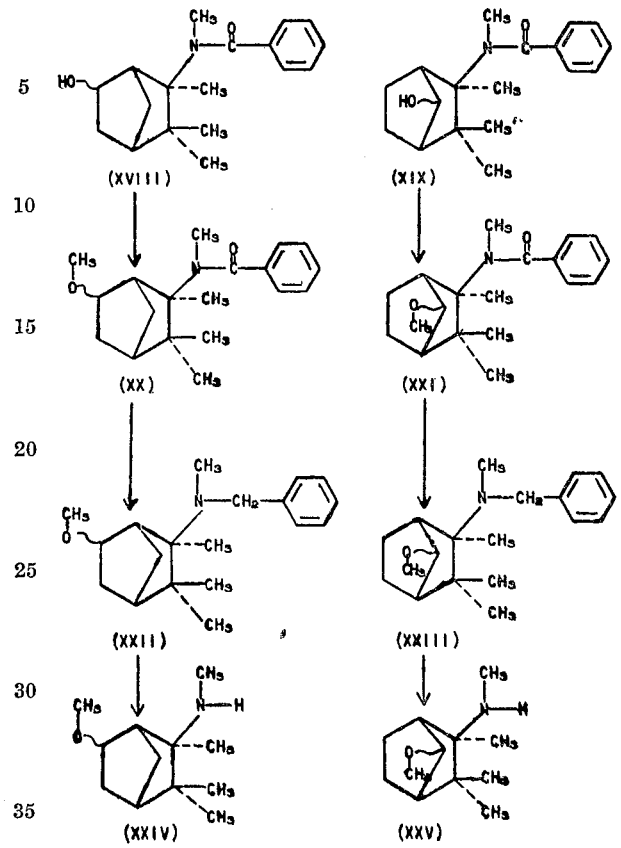

SCHEME 4

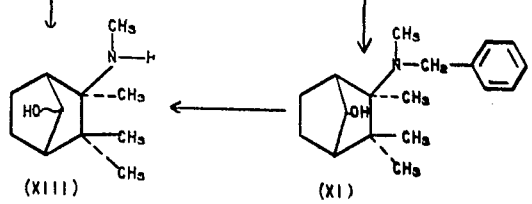

SCHEME 3

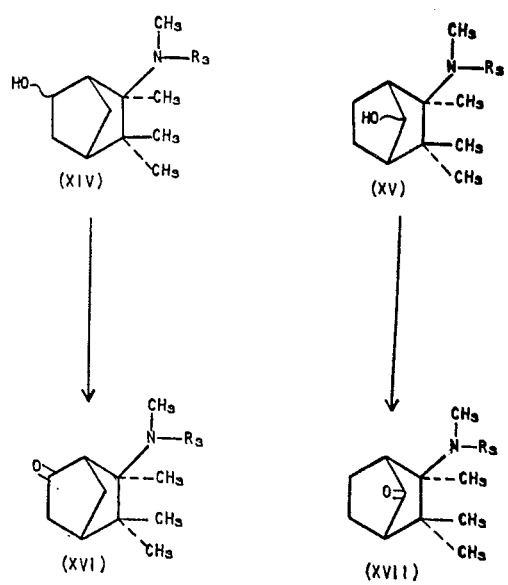

wherein R₃ is hydrogen or benzyl.

SCHEMES 1 AND 2

The compounds (II) and (III), obtained from the bioconversion process of this invention are oxidized to obtain the corresponding keto compounds of formulae (IV) and (IX) respectively, in accordance with methods known in the art for oxidizing secondary hydroxy groups to ketones, for example, Fieser and Fieser, Natural Products Related to Phenanthrene, 3rd ed., pp. 127–129, Rheinhold Publishing Corporation, New York, N.Y. Thus, the selected compound (II) or (III) is dissolved in an inert organic solvent such as acetone, benzene, methylene chloride, t-butanol, and the like, and then oxidized with aqueous chromic acid, e.g., Jones' reagent, to convert the hydroxy group to keto. The corresponding keto compounds (IV) and (IX) thus obtained, are recovered from the reaction mixture and purified by conventional methods. For example, extraction with an organic solvent, e.g., methylene chloride followed by recrystallization from a suitable organic solvent, e.g. acetone, benzene, methylene chloride, hexanes, mixtures thereof, and the like.

The keto compounds (IV) and (IX) thus obtained are selectively reduced at the ring attached keto group in accordance with methods well known in the art, for example, using sodium or potassium borohydride to obtain the corresponding endo-6-hydroxy and cis-7-hydroxy compounds of formulae (V) and (X), respectively, which are separated from the reaction mixture and purified by conventional methods such as crystallization, chromatography and the like. Alternatively, the compounds of formulae (IV) and (IX) can also be reduced at both the ring keto group and the amido group by known methods, for example, using lithium aluminum hydride to obtain the corresponding benzylamines of formulae (VI) and (XI), respectively.

The hydroxy benzamides of formulae (II), (V), (III) and (X) are reduced in accordance with methods known in the art for reducing amides to amines to obtain the corresponding hydroxy benzylamines of formulae (VII), (VI), (XII) and (XI) respectively. The reduction is preferably carried out using lithium aluminum hydride as the reducing agent. The reduction reaction is carried out in the presence of an inert organic solvent such as ether, tetrahydrofuran, benzene, diglyme, combinations thereof and the like. The reduction reaction is preferably conducted at reflux temperature and a period of about 1 to about 4 hours depending on the solvent employed is generally sufficient for completion of the reaction. The hydroxylamines thus obtained are recovered as the free bases by conventional methods and are purified if desired by distillation. Alternatively, the hydroxybenzylamines can be recovered and purified by preparation of the acid addition salts thereof in accordance with methods hereinafter described.

The hydroxybenzylamines of formulae (VII) and (VI) and formulae (XII) and (XI) thus obtained, are converted to the corresponding norbornamines of formulae (VIII) and (XIII) respectively by catalytic hydrogenolysis in accordance with methods known in the art [Organic Reaction, vol. VII, p. 277, John Wiley & Sons, Inc., New York (1953)], for example using hydrogen and palladium on carbon catalyst. The compounds of formulae (VIII) and (XIII) are recovered from the reaction mixture by conventional methods, such as removal of catalyst by filtration, extraction with a suitable organic solvent followed by chromatography and/or crystallization. Alternatively the compounds of formulae (VIII) and (XIII) are recovered as the acid addition salts as hereinafter described.

SCHEME 3

The 6-hydroxy compounds of formulae (VI), (VII) and (VIII) represented collectively by formula (XIV) and the 7-hydroxy compounds of formulae (XI), (XII) and (XIII) represented collectively by formula (XV) are oxidized using an Oppenauer oxidation, for example, using a ketone, such as acetone or cyclohexanone and an aluminum alkoxide, such as aluminum isopropoxide in an organic solvent, e.g., benzene or toluene to obtain the corresponding ketoamines of formulae (XVI) and (XVII), respectively. The keto-amines are recovered from the reaction mixture by conventional methods, for example, first neutralizing or acidifying the reaction mixture with a mineral acid, e.g., hydrochloric acid, extracting the mixture thus obtained with a suitable organic solvent, e.g., benzene, toluene, ether, methylene chloride and the like, to remove organic impurities. The aqueous layer is then made basic, for example, with sodium or potassium hydroxide and product is extracted with ether or other suitable organic solvent and the solvent is removed by evaporation or distillation. Alternatively, the keto-amines of formulae (XVI) and XVII) can be recovered as their acid addition salts as hereinafter described.

Alternatively the compounds of formulae (XVI) and (XVII) wherein $R_3$ is hydrogen are prepared from the corresponding compounds of formulae (XVI) and (XVII), respectively, wherein $R_3$ is benzyl, by catalytic hydrogenolysis as hereintofore described.

SCHEME 4

The compounds of formulae (II) and (V), represented collectively by formula XVIII and the compounds of formulae (III) and (X), represented collectively by formula (XIX) are converted to their corresponding methoxy derivatives of formulae (XX) and (XXI), respectively, in accordance with methods known in the art. The selected compound of formulae (XVIII) or (XIX) is treated with aluminum isopropoxide and diazomethane using the method of A. Popelak and G. Lettenbauer, Arch. Pharmay., 295, 427 (1962) to obtain the corresponding methoxy compounds of formulae (XX) and (XXI), respectively, which are isolated and recovered from the reaction mixture by conventional methods such as chromatography and/or crystallization from a suitable solvent.

The compounds of formulae (XX) and (XXI) thus obtained are reduced to the corresponding benzyl compounds of formulae (XXII) and (XXIII), respectively, with lithium aluminum hydride as hereintofore disclosed under Schemes 1 and 2, above, for example, the reduction of compound (II) to compound (VII).

The compounds of formulae (XXII) and (XXIII) thus obtained are then subjected to catalytic hydrogenolysis in accordance with the method hereintofore disclosed to obtain the corresponding secondary amines of formulae (XXIV) and (XXV), respectively.

Acyl derivatives of the compounds of formulae (II), (III), (V), (VI), (VII), (VIII), (X), (XII) and (XIII) of this invention are prepared in accordance with methods commonly used for preparing steroid acylates, for example by treating the selected hydroxy compound in pyridine with excess acid anhydride or acid chloride at about room temperature for 1–24 hours, or by heating the selected compound with an acid anhydride in the presence of an alkali earth carbonate such as calcium carbonate. Acylating agents which can be employed are for example the anhydrides and chlorides or organic carboxylic acids, preferably hydrocarbon carboxylic acids of 1 to 12 carbon atoms, inclusive, such as acetic, propionic, butyric, isobutyric, pivalic, valeric, isovaleric, caproic, caprylic, decanoic, dodecanoic, acrylic, crotonic, hexynoic, heptynoic, octynoic, cyclobutanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclophentylpropionic, p-toluenesulfonic acids, and the like.

The compound of formulae (VIII and (XIII) can in most instances be selectively acylated at either the 6- or 7-hydroxy group without concomitantly forming the corresponding amides. If formation of the amide is a problem the 6- and 7-acrylates of the compounds of formulae (VIII) and (XIII) can be prepared by catalytic hydrogenolysis of the corresponding acrylated benzylamines of formulae (VI), (VII), (XI) and (XII).

The free amines of formulae (VI), (VII), (VIII), (X), (XI), (XII), (XIII), (XVI), (XVII), (XXII), (XIII), (XXIV) and (XXV) of this invention can be converted by known methods to their pharmacologically acceptable acid addition salts by treating the selected amine with the appropriate acid. Acids which can be used are, for example, sulfuric, hydrochloric, nitric, phosphoric, lactic, benzoic, methanesulfonic, p-toluenesulfonic, salicyclic, acetic, propionic, maleic, malic, tartaric, citric, cyclohexanesulfamic, succinic, nicotinic, ascorbic and like acids, in the presence of an inert solvent such as methanol, ethanol, diethyl ether, ethyl acetate, and the like.

The following preparation and exampes illustrate the best mode contemplated by the inventors for carrying out their invention, but are not to be construed as limiting the scope thereof.

PREPARATION 1

N-benzoyl-N,2,3,3-tetramethyl-exo-2-norbornanamine (1)

A mixture of 78.0 g. of N,2,3,3-tetramethyl-*exo*-2-norbornanamine hydrochloride, 600 ml. of 10% sodium hydroxide solution, and 48 ml. of benzoyl chloride is stirred in an ice bath for about 1 hr. and then at room temperature for about 1 hour. After adding 36 ml. more of benzoyl chloride, the mixture is stirred for 24 hours, extracted with ether, the extract washed with water and dried over sodium sulfate. The solvent is removed and the residue crystallized by dissolving in methanol and adding water. The solid is recovered, dried and recrystallized from hexane; yield 98.0 g. of N-benzoyl-N,2,3,3-tetramethyl-*exo*-2-norbornanamine (I), m.p. 64–65° C.

EXAMPLE 1

N-benzoyl-*exo*-6-hydroxy-N-2,3,3-tetramethyl-*exo*-2-norbornanamine (II)

A medium is prepared of 40 g. of cornsteep liquor (60% solids), 20 g. of commercial dextrose diluted to 1 liter with tap water and adjusted to a pH of between 4.8 and 5.0. One ml. of UCON LB 625 (Union Carbide) is added as an antifoam agent. One hundred liters of this medium is sterilized and inoculated with 72-hour vegetative growth of *Sporotrichum sulfurescens*, ATCC 7159, and incubated at about 28° C. with aeration at about 5 l. per minute and stirring at about 300 r.p.m. After about 43 hours, or when a moderate to heavy growth of mycelium is apparent, 250 ml. of ULRAWET DS 30 (ARCO Chemical Co.) and a solution of 12 g. of N-benzoyl-N-2,3,3-tetramethyl-*exo*-2-norbornanamine (I) in about 200 ml. of N,N-dimethylformamide is added to the fermentation. After an additional 72-hour period of incubation 1500 g. of diatomaceous earth (Celite) is added and the beer and mycelium are separated by filtration.

The beer thus obtained, is extracted 4 times with 25 l. of methylene chloride. The extracts are filtered, dried over sodium sulfate and evaporated to remove the solvent. The residue thus obtained is taken up in 300 ml. of methylene chloride and chromatographed over a column containing 600 g. of Florisil (synthetic magnesium silicate). The column is eluted by the linear gradient method with 18 l. of Skellysolve B hydrocarbons containing increasing proportions of acetone from 0 to 18%. Cuts of 325 ml. each are collected and the residues therefrom examined by thin-layer chromatography (TLC) which showed the presence of N-benzoyl-*exo*-6-hydroxy-N,2,3,3-tetramethyl-*exo*-2-norbornanamine (II) and N - benzoyl-*trans*-7-hydroxy-N,2,3,3-tetramethyl - *exo* - 2 - norbornamine (III). Those fractions containing N-benzoyl-*exo*-6-hydroxy-N-,2,3,3 - tetramethyl-*exo*-2-nonbornanamine are pooled and crystallized from ether to give 3.05 g. (21% yield) of N-benzoyl-*exo*-6-hydroxy-N-2,3,3 - tetramethyl-*exo*-2-norbornanamine (I)), m.p. 178–180° C.; an analytical sample recrystallized from methylene chloride-ether, m.p. 180–182° C.

*Analysis.*—Calcd. for $C_{18}H_{25}NO_2$: C, 75.22; H, 8.77; N, 4.87. Found: C, 75.28; H, 8.86; N, 4.87.

EXAMPLE 2

N-benzoyl-6-keto-N,2,3,3-tetramethyl-*exo* - 2 - norbornanamine (IV) and N-benzoyl-7-keto-N,2,3,3-tetramethyl-*exo*-2-norbornanamine (IX)

The bioconversion and extraction procedures of Example 1, above, are repeated using 120 l. of sterilized medium of the same composition; the microorganism *Sporotrichum sulfurescens*, ATCC 7159, and 30 g. of the same substrate, N-benzoyl - N,2,3,3 - tetramethyl-*exo*-2-norbornanamine (I). Thin layer chromatographic analysis of the extract residues thus obtained shows the presence of N-benzoyl-*exo*-6-hydroxy - N,2,3,3 - tetramethyl-*exo*-2-norbornanamine (II) and N-benzoyl-*trans*-7-hydroxy-N-2,3,3-tetramethyl-*exo*-2-norbornanamine (III).

The residue extract obtained above, is dissolved in 500 ml. of acetone and oxidized with 35.0 ml. of chromic acid solution (Jones' reagent, prepared from 267 g. of chromic anhydride, 230 ml. of concentrated sulfuric acid and water sufficient to make 1 l.). The mixture is stirred for five minutes; 10.0 ml. of isopropanol is added and the mixture is concentrated under reduced pressure to about one-third volume, diluted with 500 ml. of water, and extracted several times with methylene chloride. The combined extracts are washed with water, dried over sodium sulfate and concentrated to remove the solvent to obtain 30 g. of oil. The oil thus obtained is placed on a column containing 1500 g. of Florisil. The column is eluted in cuts of 1 l. each with 4 l. each of Skellysolve B hexanes containing 5%, 8%, 11%, 14% and 17% acetone. The fractions are examined by TLC and those containing predominately N-benzoyl-6-keto-N,2,3,3-tetramethyl-*exo*-2-norbornanamine are combined to give 7.62 g. (24% yield of N-benzoyl-6-keto-N,2,3,3-tetramethyl-*exo*-2-norbornanamine (IV); an analytical sample, m.p. 82° C.

*Analysis.*—Calcd. for $C_{18}H_{23}HO_2$: C, 75.75; H, 8.12; N, 4.91. Found: C, 76.05; H, 7.98; N, 4.85.

The fractions containing predominately N-benzoyl-7-keto-N-2,3,3-tetramethyl-*exo*-2-norbornanamine are combined and the solvent removed to give 9.32 g. (29% yield) of N-benzoyl-7-keto - N - 2,3,3 - tetramethyl-*exo*-2-norbornanamine (IX); an analytical sample of which obtained by crystallization from acetone-Skellysolve B hexanes, m.p. 136–138° C.

*Analysis.*—Calcd. for $C_{18}H_{23}NO_2$: C, 75.75; H, 8.12; N, 4.91. Found: C, 76.06; H, 7.94; N, 4.72.

EXAMPLE 3

N-benzoyl-*endo*-6-hydroxy-N,2,3,3-tetramethyl-*exo*-2-norbornanamine (V)

A solution of 15 g. of N-benzoyl-6-keto-N,2,3,3-tetramethyl-*exo*-2-norbornanamine (IV) in about 250 ml. of methanol is stirred with 10.0 g. of sodium borohydride in 50 ml. of water for about 16 hr. The mixture is chilled and carefully treated with 50% aqueous acetic acid until pH 6. Most of the methanol is then evaporated, the mixture is diluted with 100 ml. of water, chilled, and the solid product recovered by filtration, washed with water, and dried, yield, 14.84 g. of N-benzoyl-*endo*-6-hydroxy-N,2,3,3-tetramethyl-*exo*-2-norbornanamine (V), m.p. 223–227° C.; recrystallized from methanol-water, m.p. 230–231° C.

*Analysis.*—Calcd. for $C_{18}H_{25}NO_2$: C, 75.22; H, 8.77; N, 4.87. Found: C, 75.32; H, 9.04; N, 5.11.

EXAMPLE 4

N-benzoyl-*cis*-7-hydroxy-N-2,3,3-tetramethyl-*exo*-2-norbornanamine (X)

Following the procedure of Example 3, above a solution of 6.0 g. of N-benzoyl-7-keto-N,2,3,3-tetramethyl-*exo*-2-norbornanamine (V) in about 100 ml. of methanol is treated with 5.0 g. of sodium borohydried in 25 ml. of water to obtain 4.34 g. of N-benzoyl-*cis*-7-hydroxy-N-2,3,3-tetramethyl-*exo*-2-norbornanamine (X), m.p. 186–188° C.; an analytical sample recrystallized from acetone-water, m.p. 186–187° C.

*Analysis.*—Calcd. for $C_{18}H_{25}NO_2$: C, 75.22; H, 8.77; N, 4.87. Found: C, 75.46; H, 8.96; N, 4.84.

EXAMPLE 5

N-benzyl - *exo* - 6 - hydroxy-N,2,3,3-tetramethyl-*exo*-2-norbornanamine (VII), and the hydrochloride salt thereof Five grams of N-benzoyl-*exo*-6-hydroxy-N,2,3,3-tetramethyl-*exo*-2-norbornanamine (II) in 100 ml. of anhydrous tetrahydrofuran is added during 10 minutes with stirring to a mixture 5.0 g. of lithium aluminum hydride and 100 ml. of ether. The mixture is refluxed for 70 minutes, chilled in a cold bath at —10° C. and cautiously treated with 25 ml. of water while stirring vigorously. When the mixture is completely white, the inorganic solid is removed by filtration and washed well with ether. The combined filtrate and wash are dried over magnesium sulfate and the solvent is evaporated to yield 4.76 g. of N-benzyl-*exo*-6-hydroxy-N,2,3,3-tetramethyl - *exo* - 2-norbornanamine (VII), as a colorless oil. For testing purposes and for analysis this free base is dissolved in ether and converted to its hydrochloride salt by addition of a slight excess of ethereal HCl. Recrystallization from methanol-ether gives N - benzyl-*exo*-6-hydroxy-N,2,3,3-tetramethyl-*exo*-2-norbornanamine, hydrochloride, m.p. 164–165° (dec.).

*Analysis.*—Calcd. for $C_{18}H_{28}NOCl$: C, 69.79; H, 9.11; Cl, 11.44. Found. C, 69.42; H, 8.94; Cl, 11.01.

EXAMPLE 6

N - benzyl-*endo*-6-hydroxy-N,2,3,3-tetramethyl-*exo*-2-norbornanamine (VI) and the hydrochloride salt thereof Following the procedure of Example 5, above, 5.0 g. of N-benzoyl-*endo*-6-hydroxy-N,2,3,3-tetramethyl-*exo*-2-norbornanamine (V) is treated with 5 g. of lithium aluminum hydride to obtain 4.75 g. of N-benzyl-*endo*-6-hydroxy-N,2,3,3-tetramethyl-*exo*-2-norbornanamine (VI), as a colorless oil; the hydrchcloride salt thereof recrystallized from methanolacetone, m.p. 89–90° C. (dec.).

Analysis.—Calcd. for $C_{18}H_{26}NOCl$: N, 4.52; Cl, 11.44. Found: N, 4.38; Cl, 11.31.

EXAMPLE 7

N - benzyl-*cis*-7-hydroxy - N,2,3,3 - tetramethyl-*exo*-2-norbornanamine (XI) and the hydrochloride salt thereof Following the procedure of Example 5, above, 4.34 g. of N-benzoyl-*cis*-7-hydroxy-N,2,3,3-tetramethyl-*exo*-2-norbornanamine (X) is converted in nearly quantitative yield to N-benzyl-*cis*-7-hydroxy-N,2,3,3-tetramethyl-*exo*-2-norbornanamine (XI), which is converted to N-benzyl-*cis*-7-hydroxy-N-2,3,3-tetramethyl-*exo*-2-norbornanamine, hydrochloride, m.p. 151–153° C.

Analysis.—Calcd. for $C_{18}H_{28}NOCl$: N, 4.52; Cl, 11.44. Found: N, 4.82; Cl, 11.63.

EXAMPLE 8

N - benzyl-*trans*-7-hydroxy-N,2,3,3-tetramethyl-*exo*-2-norbornanamine (XI) and the hydrochloride salt thereof Following the procedure of Example 5, above, N-benzoyl-*trans*-7-hydroxy - N,2,3,3 - tetramethyl-*exo*-2-norbornanamine (III) is converted in nearly quantitative yield to obtain N-benzyl-*trans*-7-hydroxy-N,2,3,3-tetramethyl-*exo*-2-norbornanamine (XII), and N-benzyl-*trans*-7-hydroxy-N,2,3,3-tetramethyl-*exo*-2-norbornanamine hydrochloride.

EXAMPLE 9

*Exo*-6-hydroxy-N,2,3,3-tetramethyl-*exo*-2-norbornanamine (VIII) and the hydrochloride salt thereof A solution of 4.0 g. of N-benzoyl-*exo*-6-hydroxy-N,2,3,3-tetramethyl - *exo* - 2-norbornanamine (VII) is dissolved in about 30 ml. of ethanol; 0.75 g. of 10% palladium on carbon is added and the mixture is shaken with hydrogen at about 45 p.s.i.g. for about 16 hours or until the uptake of hydrogen is complete. The catalyst is removed by filtration and the filtrate is concentrated *in vacuo* to give *exo*-hydroxy-N,2,3,3-tetramethyl-*exo*-2-norbornanamine (VIII) as the free base. The free base thus obtained is dissolved in ether and treated with a slight excess of ethereal hydrogen chloride to precipitate the hydrochloride salt, which is recovered by filtration, washed with ether and dried to give 2.75 g. of *exo*-6-hydroxy - N,2,3,3-tetramethyl-*exo*-2-norbornanamine, hydrochloride, m.p. 282° C. (dec.).

Analysis.—Calcd. for $C_{11}H_{21}NO \cdot HCl$: C, 60.11; H, 10.09; Cl, 16.14. Found: C, 60.36; H, 10.16; Cl, 16.13.

EXAMPLE 10

*Endo*-6-hydroxy-N,2,3,3-tetramethyl-*exo*-2-norbornanamine (VIII) and the hydrochloride salt thereof The procedure of Example 9, above, is repeated using 4.0 g. of N-benzoyl-*endo*-6-hydroxy-N,2,3,3-tetramethyl-*exo*-2-norbornanamine (V) as the starting material to obtain *endo* - 6-hydroxy-N,2,3,3-tetramethyl-*exo*-2-norbornanamine (VIII) which is treated with ethereal HCl to give 2.10 g. of *endo*-6-hydroxy-N,2,3,3-tetramethyl-*exo*-2-norbornanamine, hydrochloride, m.p. 244–247° C.

Analysis.—Calcd. for $C_{11}H_{21}NO \cdot HCl$: C, 60.11; H, 10.09; Cl, 16.14. Found: C, 59.95; H, 10.26; Cl, 15.91.

EXAMPLE 11

*Cis*-7-hydroxy-N,2,3,3-tetramethyl-*exo*-2-norbornanamine (XIII) and the hydrochloride salt thereof The procedure of Example 9, above, is repeated using 4.0 g. of N-benzyl-*cis*-7-hydroxy-N,2,3,3-tetramethyl-*exo*-2-norbornanamine (XI) as the starting material to obtain *cis* - 7-hydroxy-N,2,3,3-tetramethyl-*exo*-2-norbornanamine (XIII) which is treated with ethereal HCl to give 2.30 g. of *endo*-6-hydroxy - N,2,3,3-tetramethyl-*exo*-2-norbornanamine, hydrochloride, m.p. 270–275° C.

Analysis.—Calcd. for $C_{11}H_{21}NO \cdot HCl$: N, 6.38; Cl, 16.14. Found: N, 6.81; Cl, 16.05.

EXAMPLE 12

*Trans*-7-hydroxy-N,2,3,3-tetramethyl-*exo*-2-norbornanamine (XIII) and the hydrochloride salt thereof The procedure of Example 9, above, is repeated using 4.0 g. of N-benzoyl-*trans*-7-hydroxy-N,2,3,3-tetramethyl-*exo*-2-norbornanamine (XII) as the starting material to obtain trans-7-hydroxy - N,2,3,3 - tetramethyl-exo-2-norbornanamine (XIII) and *trans*-7-hydroxy-N,2,3,3-tetramethyl-*exo*-2-norbornanamine, hydrochloride.

EXAMPLE 13

N-benzyl-6-keto-N,2,3,3-tetramethyl-*exo*-2-norbornanamine (XVI) and the hydrochloride salt thereof A solution of 10.0 g. of N-benzyl-*endo*-6-hydroxy-N,2,3,3-tetramethyl-*exo*-2-norbornanamine (XIV) in 600 ml. of toluene and 150 ml. of cyclohexanone is distilled to remove 100 ml. of toluene. Aluminum isopropoxide (20.0 g.) is then added and the mixture is heated at reflux for about 1 hour. The reaction mixture is then cooled, poured into ice-water containing excess hydrochloric acid, stirred and the layers allowed to separate. The aqueous layer is further extracted with ether and then made basic by the addition of 50% aqueous sodium hydroxide solution. The resulting aqueous mixture is extracted with ether. The ether extract is washed with water and dried over magnesium sulfate. The dried ether solution is evaporated to remove the solvent to give N-benzyl-6-keto-N,2,3,3-tetramethyl-*exo*-2-norbornanamine (XVI) as the free base. The free base thus obtained is dissolved in ether and treated with a slight excess of ethereal hydrogen chloride and the crystalline precipitate thus obtained is recovered by filtration, washed with ether and dried to give N-benzyl-6-keto-N,2,3,3-tetramethyl-*exo*-2-norbornanamine, hydrochloride, which is further purified by recrystallization from methanol-ether.

Following the procedure of Example 13 other 6- and 7-hydroxy compounds of this invention are likewise oxidized to give the corresponding keto compounds, for example:

N-benzyl-*exo*-6-hydroxy-N,2,3,3-tetramethyl-*exo*-2-norbornanamine (XIV) to give N-benzyl-6-keto-N,2,3,3-tetramethyl-*exo*-2-norbornanamine (XVI) and the hydrochloride salt thereof;

N-benzyl-*cis*-7-hydroxy-N,2,3,3-tetramethyl-*exo*-2-norbornanamine (XV) to give N-benzyl-7-keto-N,2,3,3-tetramethyl-*exo*-2-norbornanamine (XVII) and the hydrochloride salt thereof;

N-benzyl-*trans*-7-hydroxy-N,2,3,3-tetramethyl-*exo*-2-norbornanamine (XV) to give N-benzyl-7-keto-N,2,3,3-tetramethyl-*exo*-2-norbornanamine (XVII) and the hydrochloride salt thereof;

*exo*-6-hydroxy-N,2,3,3-tetramethyl-*exo* - 2 - norbornanamine (XVI) to give 6 - keto - N,2,3,3 - tetramethyl-*exo*-2-norbornanamine (XVI) and the hydrochloride salt thereof;

*endo*-6-hydroxy-N,2,3,3-tetramethyl-*exo* - 2 - norbornanamine (XIV) to give 6-keto-N,2,3,3-tetramethyl-N,2,3,3,-tetramethyl-*exo*-2-norbornanamine (XVI) and the hydrochloride thereof;

*cis* - 7 - hydroxy-N,2,3,3-tetramethyl-*exo* - 2 - norbornanamine (XV) to give 7-keto-N,2,3,3-tetramethyl-*exo*-2- bornanamine (XVII) and the hydrochloride salt thereof; and trans-7-hydroxy-N,2,3,3-tetramethyl-*exo*-2-norbornanamine (XV) to give 7-keto-N,2,3,3-tetramethyl-*exo*-2-norbornanamine (XVII) and the hydrochloride salt thereof.

EXAMPLE 14

*Exo*-6-methoxy-N,2,3,3-tetramethyl-*exo*-2-norbornanamine (XXIV) and the hydrochloride salt thereof A solution of 5.46 g. (0.02 mole) of N-benzoyl-*exo*-6-hydroxy-N,2,3,3-tetramethyl-*exo*-2-norbornanamine (XVIII) in about 150 ml. of methylene chloride is treated with 2.5 g. of aluminum isopropoxide and then with 100 ml. of a methylene chloride solution of diazomethane (prepared from 265 ml. of methylene chloride, 22.0 g. of N-methyl-N'-nitro-N-nitrosoguanidine, and 70 ml. of 45% potassium hydroxide solution). After standing at room temperature for about 3.5–4 hrs., 100 ml. more methylene chloride solution of diazomethane is added. The mixture is allowed to stand for about 22 hrs. The solution is washed with 100 ml. of water, 100 ml. of 10% sulfuric acid, and twice with 50 ml. of water and dried over sodium sulfate. The methylene chloride solution is chromatographed over Florisil, eluting by the linear gradient method with 6 l. of solvent, Skellysolve B hexanes containing increasing proportions of acetone. Cuts of 200 ml. each are taken and the residues examined by TLC and infrared assays. The cuts containing the desired product are combined to give 3.57 g. of N-benzoyl-*exo*-6-methoxy-N,2,3,3-tetramethyl-*exo*-2-norbornanamine (XX) which is dissolved in about 50 ml. of ether and reduced with a solution of 4.0 g. of LiAlH$_4$ in 100 ml. of ether. The mixture, thus obtained is refluxed for about 70 minutes, chilled in a cold bath at −10° and cautiously treated with 25 ml. of water while stirring vigorously. When the mixture is completely white, the inorganic solid is removed by filtration and washed well with ether. The combined filtrate and wash are dried over magnesium sulfate and the solvent is evaporated to yield 2.89 g. of N-benzyl-*exo*-6-methoxy-N,2,3,3-tetramethyl-*exo*-2-norbornanamine (XXII) as a white solid. The product thus obtained, (2.89 g.) is dissolved in about 100 ml. of ethanol by warming and reduced with hydrogen and 0.5 g. of 10% palladium on carbon catalyst at about 45 p.s.i.g. until the uptake of hydrogen is complete (about 16 hours). The catalyst is removed by filtration and the filtrate is concentrated *in vacuo* to give *exo*-6-methoxy-N,2,3,3-tetramethyl-*exo*-2-norbornanamine (XXIV) as the free base. The free base thus obtained is dissolved in ether and treated with a slight excess of ethereal hydrogen chloride to precipitate the hydrochloride salt which is recovered by filtration and recrystallized from methanol-ether to give 1.57 g. of *exo*-6-methoxy-N,2,3,3-tetramethyl-*exo*-2-norbornanamine, hydrochloride, m.p. 253° C. (dec.).

*Analysis.*—Calcd. for $C_{12}H_{23}NO \cdot HCl$: C, 61.65; H, 10.35; N, 5.99; Cl, 15.17. Found: C, 61.79; H, 10.78; N, 6.06; Cl, 14.99.

EXAMPLE 15

*Endo*-6-methoxy-N,2,3,3-tetramethyl-*exo*-2-norbornanamine (XX) and the hydrochloride salt thereof Following the procedure of Example 14, above 5.46 g. (0.02 mole) of N-benzoyl-*endo*-6-hydroxy-N,2,3,3-tetramethyl-*exo*-2-norbornanamine (XVIII) is treated with 2.5 g. of aluminum isopropoxide and then with 100 ml. of diazomethane solution to obtain N-benzoyl-*endo*-6-methoxy-N,2,3,3-tetramethyl-*exo*-2-norbornanamine (XX), which is then reduced with 4.0 g. of lithium aluminum hydride to give N-benzyl-*endo*-6-methoxy-N,2,3,3-tetramethyl-*exo*-2-norbornanamine (XXII). Compound (XXII) thus obtained is then reduced with hydrogen and 0.5 g. of palladium on carbon catalyst to give *endo*-6-methoxy-N,2,3,3-tetramethyl-*exo*-2-norbornanamine (XXIV) as the free base, which is treated with ethereal hydrogen chloride and recrystallized to give 2.21 g. of *endo*-6-methoxy-N,2,3,3-tetramethyl-*exo*-2-norbornanamine, hydrochloride, m.p. 282° C. (dec.).

*Analysis.*—Calcd. for $C_{12}H_{23}NOCl$: C, 61.65; H, 10.35; N, 5.99; Cl, 15.17. Found: C, 62.07; H, 10.33; N, 6.28; Cl, 15.30.

EXAMPLE 16

*Cis*-7-methoxy-N,2,3,3-tetramethyl-*exo*-2-norbornanamine (XXV) and the hydrochloride salt thereof Following the procedure of Example 14, above 5.46 g. (0.02 mole) of N-benzoyl-*cis*-7-hydroxy-N,2,3,3-tetramethyl-*exo*-2-norbornanamine (compound XXIII). Com. g. of aluminum isopropoxide and then with 100 ml. of diazomethane solution to obtain N-benzoyl-*cis*-7-methoxy-N,2,3,3-tetramethyl-*exo*-2-norbornanamine (XXI), which is then reduced with 4.0 g. of lithium aluminum hydride to give N-benzyl-*cis*-7-methoxy-N,2,3,3-tetramethyl-*exo*-2-norbornanamine (compound XXIII). Compound (XXIII) thus obtained, is then reduced with hydrogen and 0.5 g. of palladium on carbon catalyst to give *cis*-7-methoxy-N,2,3,3-tetramethyl-*exo*-2-norbornanamine (XXV) as the free base, which is treated with ethereal hydrogen chloride and recrystallized to give 2.09 g. (49% yield) of *cis*-7-methoxy-N,2,3,3-tetramethyl-*exo*-2-norbornanamine, hydrochloride, m.p. 282° C. (dec.).

*Analysis.*—Calcd. for $C_{12}H_{23}NOCl$, C, 61.65; H, 10.35; N, 5.99; Cl, 15.17. Found: C, 61.71; H, 10.26; N, 6.34; Cl, 15.14.

EXAMPLE 17

*Trans*-7-methoxy-N-2,3,3-tetramethyl-*exo*-2-norbornanamine (XXV) and the hydrochloride salt thereof Following the procedure of Example 14, above 5.46 g. (0.02 mole) of N-benzoyl-*trans*-7-hydroxy-N-2,3,3-tetramethyl-*exo*-2-norbornanamine (XIX) is treated with 2.5 g. of aluminum isopropoxide and then with 100 ml. of diazomethane solution to obtain N-benzoyl-*trans*-7-methoxy-N,2,3,3-tetramethyl-*exo*-2-norbornanamine (XXI), which is then reduced with 4.0 g. of lithium aluminum hydride to give N-benzyl-*trans*-7-methoxy-N,2,3,3-tetramethyl-*exo*-2-norbornanamine (XXIII). Compound (XXIII) thus obtained, is then reduced with hydrogen and 0.5 g. of palladium on carbon catalyst to give *trans*-7-methoxy-N,2,3,3-tetramethyl-*exo*-2-norbornanamine (XXV) as the free base, which is treated with ethereal hydrogen chloride and recrystallized to give *trans*-7-methoxy-N,2,3,3-tetramethyl-*exo*-2-norbornanamine, hydrochloride.

EXAMPLE 18

N-benzyl-*exo*-6-hydroxy-N,2,3,3-tetramethyl-*exo*-2-norbornanamine, tosylate

A solution of 3 g. of N-benzyl-*exo*-6-hydroxy-N,2,3,3-tetramethyl-*exo*-2-norbornanamine (VII) in about 15 ml. of pyridine is treated with 4.0 g. of p-toluenesulfonyl chloride at room temperature for about 22 hrs. The mixture is poured onto 50 g. of ice and stirred. The aqueous phase is decanted from the oily product which is washed twice with water by stirring and decantation. About 2.0 ml. of methanol is then added and the oil is crystallized. The product is recovered by filtration and washed with a little cold methanol to give 3.40 g. of N-benzyl-*exo*-6-hydroxy-N, 2,3,3-tetramethyl-*exo*-2-norbornanamine, tosylate, m.p. 62–66° C.; an analytical sample is obtained by recrystallization from methanol, m.p. 67–69° C.

*Analysis.*—Calcd. for $C_{28}H_{33}NO_3S$: C, 70.22; H, 7.78; N, 3.28; S, 7.50. Found: C, 70.19; H, 7.94; N, 3.19; S, 7.81.

EXAMPLE 19

N-benzyl-*endo*-6-hydroxy-N,2,3,3-tetramethyl-*exo*-2-norbornanamine, tosylate

Following the procedure of Example 4, above, 1.17 g. of N-benzyl-*endo*-6-hydroxy-N,2,3,3-tetrahydro-*exo*-2- norbornanamine (VI) in about 5 ml. of pyridine is treated with 1.5 g. of p-toluenesulfonyl chloride to obtain 1.4 g. of N-benzyl-*endo* - 6-hydroxy-N,2,3,3-tetramethyl-*exo*-2-norbornanamine, tosylate, m.p. 116–117° C.

*Analysis*.—Calcd. for $C_{25}H_{33}NO_3S$: C, 70.22; H, 7.78; N, 3.28; S, 7.50. Found: C, 70.34; H, 7.81; N, 3.18; S, 7.38.

EXAMPLE 20

N-benzyl-*cis*-7-hydroxy-N-2,3,3-tetramethyl-*exo*-2-norbornanamine, tosylate

Following the procedure of Example 4, above, 3.67 g. of N-benzyl-*cis*-7-hydroxy-N,2,3,3-tetramethyl-*exo*-2-norbornanamine (XI) in about 20 ml. of pyridine is treated with 5.0 g. of p-toluenesulfonyl chloride to obtain 3.34 g. of N-benzyl-*cis*-7-hydroxy-N,2,3,3-tetramethyl-*exo*-2-norbornanamine, tosylate, m.p. 124–126° C.

*Analysis*.—Calcd. for $C_{23}H_{33}NO_3S$: C, 70.22; H, 7.78; N, 3.38; S, 7.50. Found: C, 69.96; H, 7.85; N, 3.45; S, 7.38.

EXAMPLE 21

N-benzyl-*trans*-7-hydroxy-N,2,3,3-tetramethyl-*exo*-2-norbornanamine, tosylate

Following the procedure of Example 4, above, 3.67 g. of N-benzyl-*trans* - 7-hydroxy-N,2,3,3-tetramethyl-*exo*-2-norbornanamine (XII) in about 20 ml. of pyridine is treated with 5.0 g. of p-toluenesulfonyl chloride to obtain N-benzyl-*trans* - 7 - hydroxy-N,2,3,3-tetramethyl-*exo*-2-norbornanamine, tosylate.

What is claimed is:

1. A compound of the formula A, B, C or D:

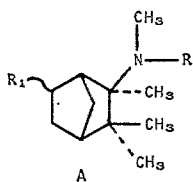
A

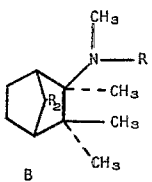
B

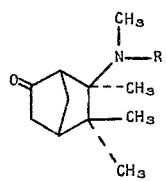
C

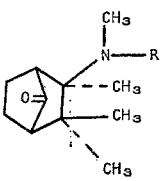
D wherein R is benzoyl and $R_1$ and $R_2$ are each hydroxy or methoxy.

2. A compound of the formula:

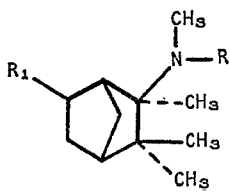

wherein R is benzoyl; and $R_1$ is hydroxy or methoxy.

3. A compound of the formula:

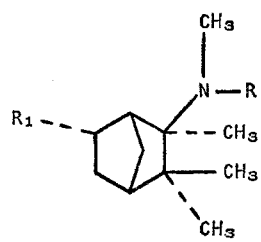

wherein R is benzoyl; and $R_1$ is hydroxy or methoxy.

4. A compound of the formula:

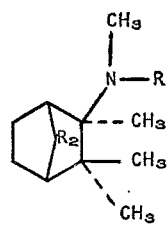

wherein R is benzoyl; and $R_2$ is hydroxy or methoxy.

5. N - benzoyl - *exo* - 6 - hydroxy - N,2,3,3 - tetramethyl-*exo*-2-norbornanamine, the compound of claim 2 wherein R is benzoyl and $R_1$ is hydroxy.

6. N - benzoyl - *exo* - 6 - methoxy - N,2,3,3 - tetramethyl-*exo*-2-norbornanamine, the compound of claim 2 wherein R is benzoyl and $R_1$ is methoxy.

7. N - benzoyl - *endo* - 6-hydroxy - N,2,3,3 - tetramethyl-*exo*-2-norbornanamine, the compound of claim 3 wherein R is benzoyl and $R_1$ is hydroxy.

8. N - benzoyl - *endo* - 6 - methoxy - N,2,3,3 - tetramethyl-*exo*-2-norbornanamine, the compound of claim 3 wherein R is benzoyl and $R_1$ is methoxy.

9. N - benzoyl - *cis* - 7 - hydroxy - N,2,3,3 - tetramethyl-*exo*-2-norbornanamine, the compound of claim 4 wherein R is benzoyl and $R_2$ is hydroxy.

10. N - benzoyl - *cis* - 7 - methoxy - N,2,3,3 - tetramethyl-*exo*-2-norbornanamine, the compound of claim 4 wherein R is benzoyl and $R_2$ is methoxy.

11. N - benzoyl - 6 - keto - N,2,3,3 - tetramethyl - *exo*-2-norbornanamine.

12. N - benzoyl - 7 - keto - N,2,3,3 - tetramethyl - *exo*-2-norbornanamine.

References Cited

Herr et al.: J. Med. Chem., vol. 14, pp. 842–45 (1971).

HARRY I. MOATZ, Primary Examiner

U.S. Cl. X.R.

195—51 R; 260——456 P, 468 R, 476 R, 485 L, 486 R, 488 CD, 570.9, 584 R; 424—324

UNITED STATES PATENT OFFICE
CERTIFICATE OF CORRECTION

Patent No. 3,847,982                    Dated November 12, 1974

Inventor(s) Milton E. Herr, Herbert C. Murphy, Gunther S. Fonken

It is certified that error appears in the above-identified patent and that said Letters Patent are hereby corrected as shown below:

Column 7, lines 9-10, "hydroxylamines" should read -- hydroxybenzylamines --. Column 8, line 13, "(X), (XII) and" should read -- (X), (XI), (XII) and --. Column 9, line 40, "(I))," should read -- (II), --. Column 12, line 67, "(XVI)" should read -- (XIV) --. Column 13, line 1, "-bornanamine" should read -- -norbornanamine --. Column 14, lines 13-14, "(compound XXIII). Com.- g. of" should read -- (XIX) is treated with 2.5 g. of --. Column 15, line 18, "N, 3.38;" should read -- N, 3.28; --.

Signed and Sealed this second Day of August 1977

[SEAL]

Attest:

RUTH C. MASON
Attesting Officer

C. MARSHALL DANN
Commissioner of Patents and Trademarks